US008798880B2

(12) United States Patent
Cousins et al.

(10) Patent No.: US 8,798,880 B2
(45) Date of Patent: Aug. 5, 2014

(54) SYSTEM AND METHOD FOR CONTROLLING LOADS ON A DUAL MASS FLYWHEEL ATTACHED TO AN ENGINE BASED ON ENGINE SPEED

(75) Inventors: William L. Cousins, Ortonville, MI (US); James M. Partyka, Clarkston, MI (US)

(73) Assignee: GM Global Technology Operations LLC

( * ) Notice: Subject to any disclaimer, the term of this patent is extended or adjusted under 35 U.S.C. 154(b) by 250 days.

(21) Appl. No.: 13/242,121

(22) Filed: Sep. 23, 2011

(65) Prior Publication Data
US 2013/0080001 A1   Mar. 28, 2013

(51) Int. Cl.
F16H 63/42 (2006.01)
G06F 19/00 (2011.01)

(52) U.S. Cl.
USPC ............................ 701/54; 701/64; 474/110

(58) Field of Classification Search
USPC ............ 701/54, 64; 340/439, 432; 280/260; 474/110
See application file for complete search history.

(56) References Cited

U.S. PATENT DOCUMENTS

| | | | |
|---|---|---|---|
| 4,371,051 A | 2/1983 | Achterholt | |
| 4,488,455 A | 12/1984 | Shetler et al. | |
| 4,622,637 A * | 11/1986 | Tomita et al. | 701/64 |
| 4,701,852 A * | 10/1987 | Ulveland | 701/64 |
| 4,723,215 A * | 2/1988 | Hibino et al. | 701/123 |
| 4,752,883 A * | 6/1988 | Asakura et al. | 701/64 |
| 5,020,361 A * | 6/1991 | Malecki et al. | 73/115.02 |
| 5,797,110 A | 8/1998 | Braun et al. | |
| 5,941,922 A * | 8/1999 | Price et al. | 701/51 |
| 6,364,810 B1 * | 4/2002 | Hughes | 477/124 |
| 6,367,344 B1 | 4/2002 | Vogt et al. | |
| 6,382,045 B1 | 5/2002 | Wheeler | |
| 7,051,609 B2 | 5/2006 | Zimmermann et al. | |
| 7,449,878 B2 | 11/2008 | Lee | |
| 7,668,630 B2 | 2/2010 | Weber et al. | |
| 2004/0104719 A1 | 6/2004 | Johnson et al. | |
| 2008/0074104 A1 | 3/2008 | Sauer et al. | |
| 2008/0078604 A1 | 4/2008 | Ersoy et al. | |
| 2010/0024768 A1 * | 2/2010 | Ota et al. | 123/350 |
| 2010/0312442 A1 | 12/2010 | Ahn | |
| 2012/0152049 A1 | 6/2012 | Benson et al. | |
| 2012/0187940 A1 | 7/2012 | Uhlenbruck | |

(Continued)

FOREIGN PATENT DOCUMENTS

DE   3823384 A1   1/1990
DE   19908036 A1   8/2000

(Continued)

OTHER PUBLICATIONS

Schwenger, Andreas; English abstract of Dissertation (p. 5), "Active Damping of Driveline Oscillations", 160 total pages, Jul. 1970.

(Continued)

Primary Examiner — Tan Q Nguyen

(57) ABSTRACT

A system according to the principles of the present disclosure includes an engine speed module and a downshift indicator module. The engine speed module determines an engine speed when a clutch is engaged with a dual mass flywheel. The downshift indicator module generates a downshift indicator signal when the engine speed is less than a first speed, the downshift indicator signal indicating when to downshift a manual transmission.

20 Claims, 4 Drawing Sheets

(56) References Cited

U.S. PATENT DOCUMENTS

| | | |
|---|---|---|
| 2013/0060436 A1 | 3/2013 | Cousins et al. |
| 2013/0080001 A1 | 3/2013 | Cousins et al. |
| 2013/0300403 A1 | 11/2013 | Benson et al. |

FOREIGN PATENT DOCUMENTS

| | | |
|---|---|---|
| DE | 19924995 A1 | 12/2000 |
| DE | 10310831 A1 | 11/2003 |
| DE | 10308748 A1 | 12/2003 |
| DE | 10333931 A1 | 2/2005 |
| DE | 102007032996 A1 | 2/2008 |
| DE | 102007045443 A1 | 4/2009 |
| DE | 102010002592 A1 | 9/2010 |
| DE | 102009054239 A1 | 5/2011 |
| DE | 102009053873 A1 | 6/2011 |
| EP | 1930631 A2 | 6/2008 |
| GB | 2466040 A | 6/2010 |
| WO | WO-2005009770 A1 | 2/2005 |
| WO | WO-2011061223 A1 | 5/2011 |

OTHER PUBLICATIONS

U.S. Appl. No. 61/425,626, filed Dec. 21, 2010, Benson et al.

* cited by examiner though the detailed description
SYSTEM AND METHOD FOR CONTROLLING LOADS ON A DUAL MASS FLYWHEEL ATTACHED TO AN ENGINE BASED ON ENGINE SPEED

FIELD

The present disclosure relates to systems and methods for controlling loads on a dual mass flywheel attached to an engine based on engine speed.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A manual transmission typically includes different gears (e.g., first, second) that are engaged to transfer torque from an engine to a driveline at different gear ratios. To shift a manual transmission, a driver depresses a clutch pedal to disengage a clutch and thereby decouple the transmission from the engine. The driver then manipulates a gear selector to select a different gear and releases the clutch to reengage the engine and the transmission.

Some vehicles equipped with a manual transmission may include a dual mass flywheel. A dual mass flywheel includes a damper, such as a series of radially positioned springs with controlled friction, to minimize driveline vibrations that may cause undesirable noise and/or damage components of the powertrain or driveline. The dual mass flywheel is attached to and rotates with a crankshaft of an engine, and a clutch engages the dual mass flywheel to couple the engine and a transmission.

SUMMARY

A system according to the principles of the present disclosure includes an engine speed module and a downshift indicator module. The engine speed module determines an engine speed when a clutch is engaged with a dual mass flywheel. The downshift indicator module generates a downshift indicator signal when the engine speed is less than a first speed, the downshift indicator signal indicating when to downshift a manual transmission.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
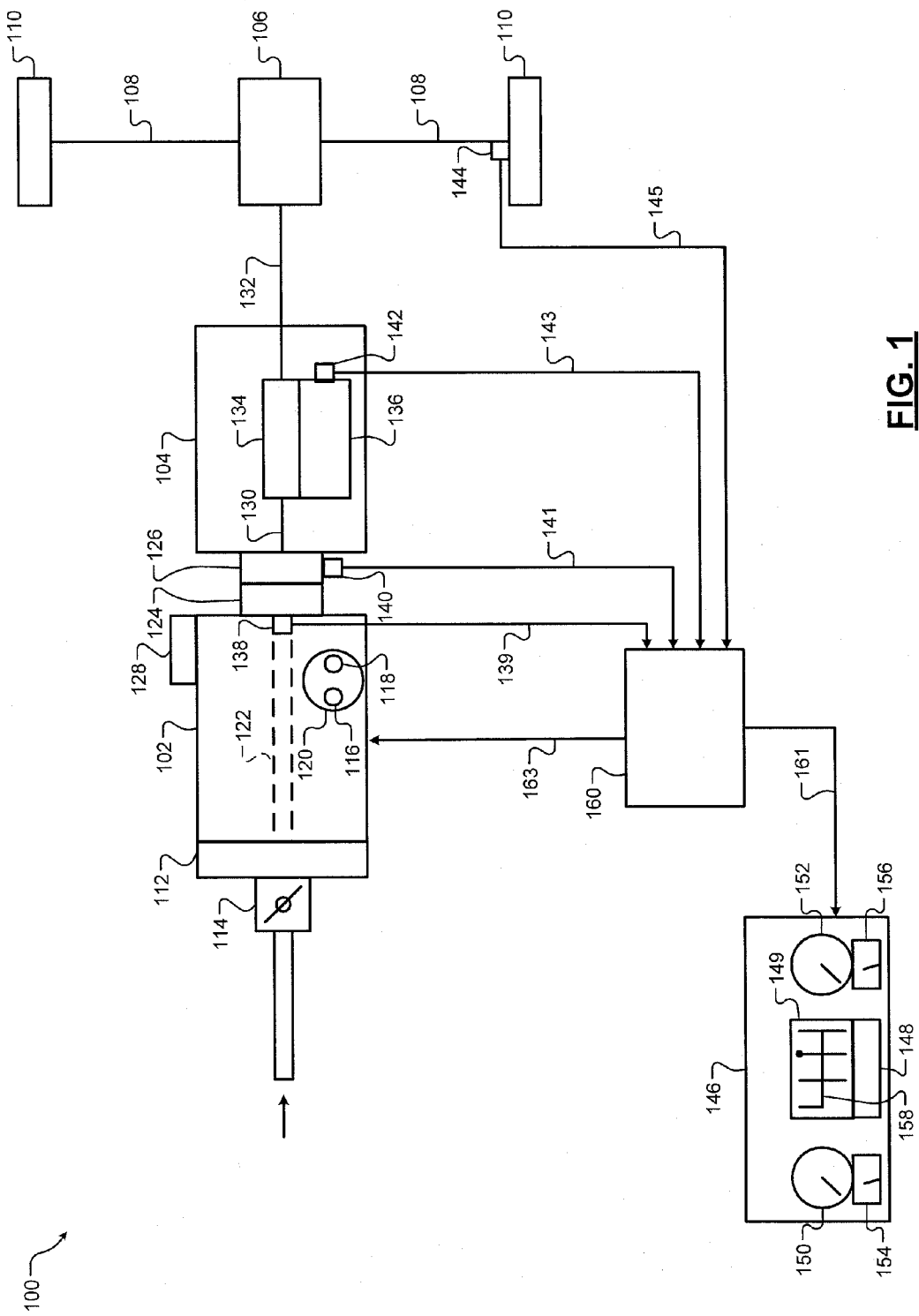
FIG. 1 is a functional block diagram of an example vehicle system according to the principles of the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

A vehicle equipped with a manual transmission may include a dual mass flywheel attached to an engine. The dual mass flywheel dampens engine vibrations that may be transmitted to the manual transmission. If a driver decelerates the vehicle without downshifting the manual transmission or disengaging a clutch to decouple the manual transmission from the engine, the manual transmission slows down the engine. The manual transmission may also slow down the engine if the driver upshifts the manual transmission. In either case, engine speed may decrease to less than idle speed, which may cause the dual mass flywheel to oscillate at a resonant frequency.

The dual mass flywheel may include a damper mass, damper springs, and end stops. The damper mass and the damper springs cooperate to dampen vibrations, and the end stops limit travel of the damper springs. If the secondary mass oscillates at a resonant frequency, the energy of the oscillations may cause the damper springs to reach full travel and contact the end stops with excessive force. In turn, the damper springs and the end stops may fracture, and the dual mass flywheel may dampen vibrations less effectively. This may increase transmission and driveline noise and vibrations, which may dissatisfy the driver.

In addition, operating the engine at less than the idle speed reduces torque available to maintain vehicle speed or accelerate the vehicle. Thus, when the engine speed is at or near a resonant speed that causes the dual mass flywheel to oscillate at a resonant frequency, the engine may not perform as well as expected and the engine may stall. Poor engine performance and engine stalls may dissatisfy the driver.

A system and method according to the principles of the present disclosure instructs a driver to downshift a manual transmission when engine speed is less than a first speed. The first speed may be greater than a resonant speed of an engine that causes a dual mass flywheel attached to the engine to oscillate at a resonant frequency. The driver may be instructed to downshift to a particular gear using a visual message (e.g., text), an audible message (e.g., chime), and/or a tactile message (e.g., vibration).

The driver may be instructed to downshift when a clutch is disengaged and a selected gear of the manual transmission may cause the engine speed to decrease to less than the first speed when the clutch is reengaged. The engine speed when the clutch is reengaged may be estimated based on the selected gear and vehicle speed. The selected gear may be determined based on a measured position of a gear selector. The driver manipulates the gear selector to select a gear of the manual transmission.

In addition, the engine may be stopped when the engine speed is less than a second speed. The second speed may be less than the first speed and greater than the resonant speed. Thus, if the driver does not downshift as instructed by the shift indicator, the engine may be stopped to prevent damage to the dual mass flywheel.

Referring to FIG. 1, a functional block diagram of an example vehicle system 100 is presented. The vehicle system 100 includes an engine 102, a transmission 104, a differential 106, driveshafts 108, and drive wheels 110. The engine 102 generates drive torque. While the engine 102 is shown and will be discussed as a spark-ignition internal combustion engine (ICE), the engine 102 may include another suitable type of engine, such as a compression-ignition ICE. One or more electric motors (or motor-generators) may also generate drive torque.

Air is drawn into the engine 102 through an intake manifold 112. Airflow into the engine 102 may be varied using a throttle valve 114. One or more fuel injectors, such as a fuel injector 116, mix fuel with the air to form an air/fuel mixture. A spark plug 118 ignites the air/fuel mixture to combust the air/fuel mixture within cylinders of the engine 102, such as a cylinder 120. Although the engine 102 is depicted as including one cylinder, the engine 102 may include more than one cylinder.

The cylinder 120 includes a piston (not shown) that is mechanically linked to a crankshaft 122. The engine 102 outputs torque to the transmission 104 via the crankshaft 122. A flywheel 124 is attached to and rotates with the crankshaft 122. A clutch 126 engages the flywheel 124 to couple the transmission 104 to the engine 102. The flywheel 124 may be a dual mass flywheel that includes a damper.

One combustion cycle within the cylinder 120 may include four phases: an intake phase, a compression phase, a combustion phase, and an exhaust phase. During the intake phase, the piston moves toward a bottommost position and draws air into the cylinder 120. During the compression phase, the piston moves toward a topmost position and compresses the air or air/fuel mixture within the cylinder 120.

During the combustion phase, spark from the spark plug 118 ignites the air/fuel mixture. The combustion of the air/fuel mixture drives the piston back toward the bottommost position, and the piston drives rotation of the crankshaft 122. Resulting exhaust gas is expelled from the cylinder 120 through an exhaust manifold 128 to complete the exhaust phase and the combustion event.

The transmission 104 transfers drive torque from the engine 102 to the differential 106 at a gear ratio corresponding to a selected gear. The transmission 104 includes an input shaft 130, an output shaft 132, and gears 134. The input shaft 130 couples the clutch 126 and the gears 134. The output shaft 132 couples the gears 134 and the differential 106. The gears 134 transmit torque from the input shaft 130 to the output shaft 132 at various gear ratios. The gears 134 include a reverse gear, a first gear, and one or more higher gears that are higher than first gear. A gear selector 136 is manipulated by a driver to select one of the gears 134 to achieve a desired gear ratio. An example of a gear selector is discussed below with reference to FIGS. 2 and 3. The differential 106 transfers drive torque from the output shaft 132 to the driveshafts 108. The driveshafts 108 couple the differential 106 to the drive wheels 110.

The vehicle system 100 includes sensors that measure operating conditions of the vehicle system 100. A crankshaft position sensor 138 measures the position of the crankshaft 122 and generates a crankshaft position signal 139 indicating the crankshaft position. The crankshaft position may be used to determine engine speed. A clutch position sensor 140 measures the position of the clutch 126 and generates a clutch position signal 141 indicating the clutch position. The clutch position may be used to determine whether the clutch 126 is engaged and the degree of engagement.

A selector position sensor 142 determines the position of the gear selector 136 and generates a selector position signal 143 indicating the selector position. The selector position may be used to determine the selected gear, which may be one of the gears 134 or neutral. Examples of selector position sensors are discussed below with reference to FIGS. 2 and 3. A wheel speed sensor 144 measures the speed of the drive wheels 110 and generates a wheel speed signal 145 indicating the wheel speed. The wheel speed may be used to determine vehicle speed.

The vehicle system 100 includes a driver interface 146 that relays information to the driver. The driver interface 146 includes a shift indicator 148. For illustration purposes only, the driver interface 146 is depicted as also including a gear indicator 149, a speedometer 150, a tachometer 152, a temperature gauge 154, and a fuel gauge 156. The gear indicator 149 indicates the selected gear by displaying the selected gear and/or the position of the gear selector 136 relative to a shift pattern 158. The shift indicator 148 delivers a visual message (e.g., text), an audible message (e.g., chime), and/or a tactile message (e.g., vibration) instructing the driver to shift to a lower gear.

A control module 160 controls the engine 102 and the driver interface 146. The control module 160 generates a downshift indicator signal 161 indicating when to downshift the transmission 104. The shift indicator 148 instructs the driver to downshift in response to the downshift indicator signal 161. The control module 160 generates the downshift indicator signal 161 when the engine speed is less than a first speed. The control module 160 determines the engine speed based on the crankshaft position. The first speed may be predetermined and may be greater than a resonant speed of the engine 102 that causes the flywheel 124 to oscillate at a resonant frequency.

The control module 160 may generate the downshift indicator signal 161 when the clutch 126 is disengaged from the flywheel 124 and the selected gear may cause the engine speed to decrease to less than the first speed when the clutch 126 is reengaged. The control module 160 may estimate the engine speed when the clutch is reengaged based on the selected gear and vehicle speed. The control module 160 may determine the selected gear based on the selector position.

The control module 160 may generate an engine control signal 163 to stop the engine 102 when the engine speed is less than a second speed. The second speed may be predetermined, less than the first speed, and/or greater than the resonant speed. Thus, if the driver does not downshift as instructed by the shift indicator 148, the control module 160 may stop the engine 102 to prevent damage to the flywheel 124.

Figure 2:
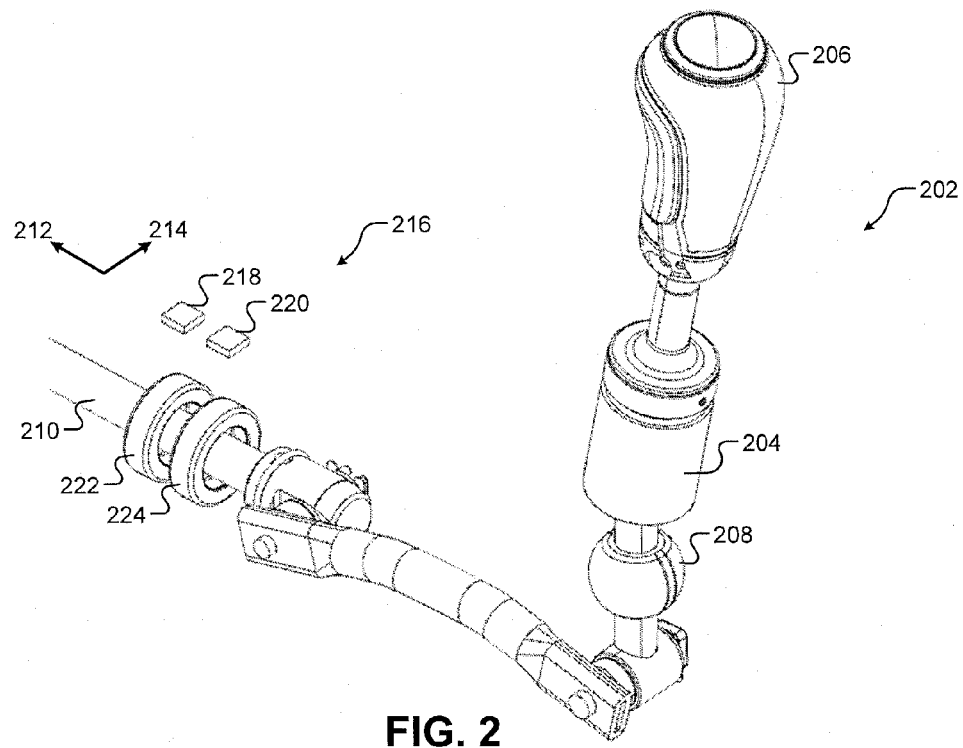
FIGS. 2 and 3 are perspective views of an example gear selector and example selector position sensors according to the principles of the present disclosure.

Referring to FIG. 2, a gear selector 202 includes a shift lever 204 that terminates in a shift handle 206. A driver moves the shift lever 204 through a shift pattern, such as the shift pattern 158 shown in FIG. 1, to shift gears. The shift lever 204 is disposed in a ball pivot 208 and coupled to a shaft 210 oriented along a longitudinal axis 212. Moving the shift lever 204 in the direction of the longitudinal axis 212 translates the shaft 210 along the longitudinal axis 212. Moving the shift lever 204 in the direction of a lateral axis 214 rotates the shaft 210 about the longitudinal axis 212.

A selector position sensor 216 includes a first sensor 218, a second sensor 220, a first magnet 222, and a second magnet 224. The first magnet 222 and the second magnet 224 are attached to the shaft 210. The first sensor 218 and the second sensor 220 are one-dimensional Hall effect sensors mounted proximate to the first magnet 222 and the second magnet 224. The output voltages or duty cycles of the first sensor 218 and the second sensor 220 vary in response to the magnetic fields of the first magnet 222 and the second magnet 224 as the shaft 210 is translated or rotated relative to the longitudinal axis 212. In this regard, the first sensor 218 and the second sensor 220 detect the proximity of the first magnet 222 and the second magnet 224, and their duty cycles may be used to determine the position of the gear selector 202.

Figure 3:
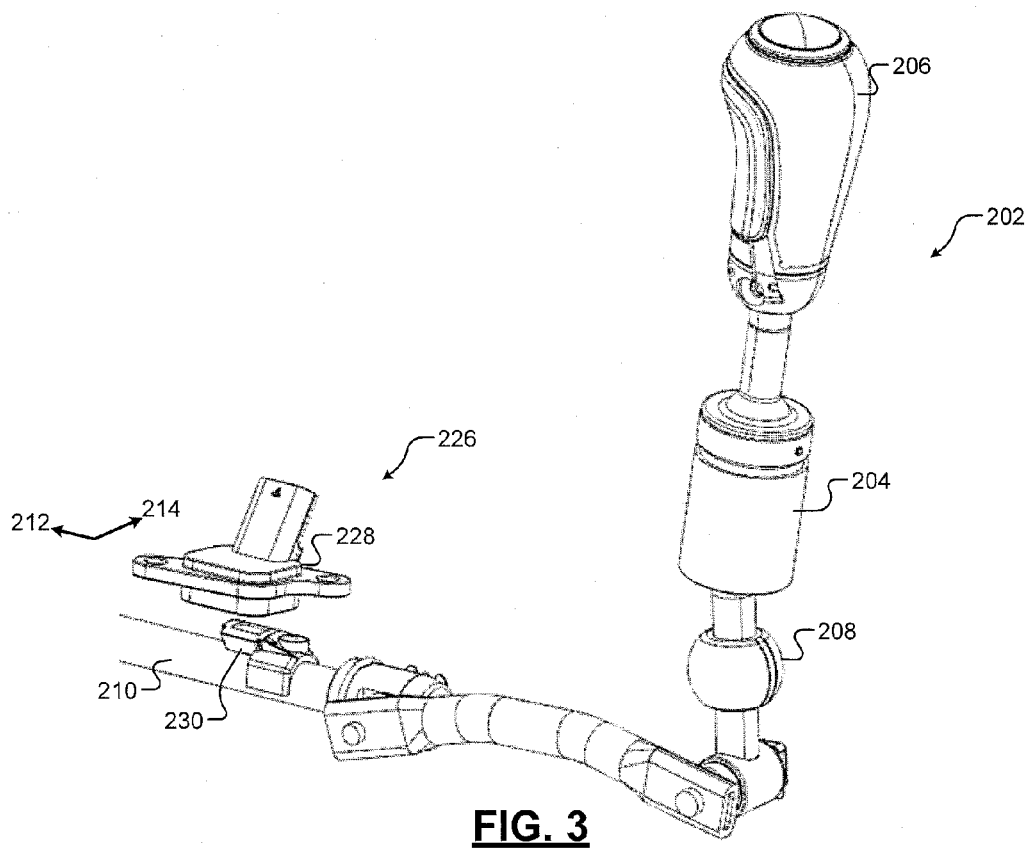

Referring to FIG. 3, a selector position sensor 226 includes a sensor 228 and a magnet 230. The magnet 230 is attached to the shaft 210. The sensor 228 is a three-dimensional Hall effect sensor mounted proximate to the magnet 230. The output voltage or duty cycle of the sensor 228 varies in response to the magnetic field of the magnet 230 as the shaft 210 is translated or rotated relative to the longitudinal axis 212. In this regard, the sensor 228 detects the proximity of the magnet 230, and the duty cycle of the sensor 228 may be used to determine the position of the gear selector 202.

Figure 4:
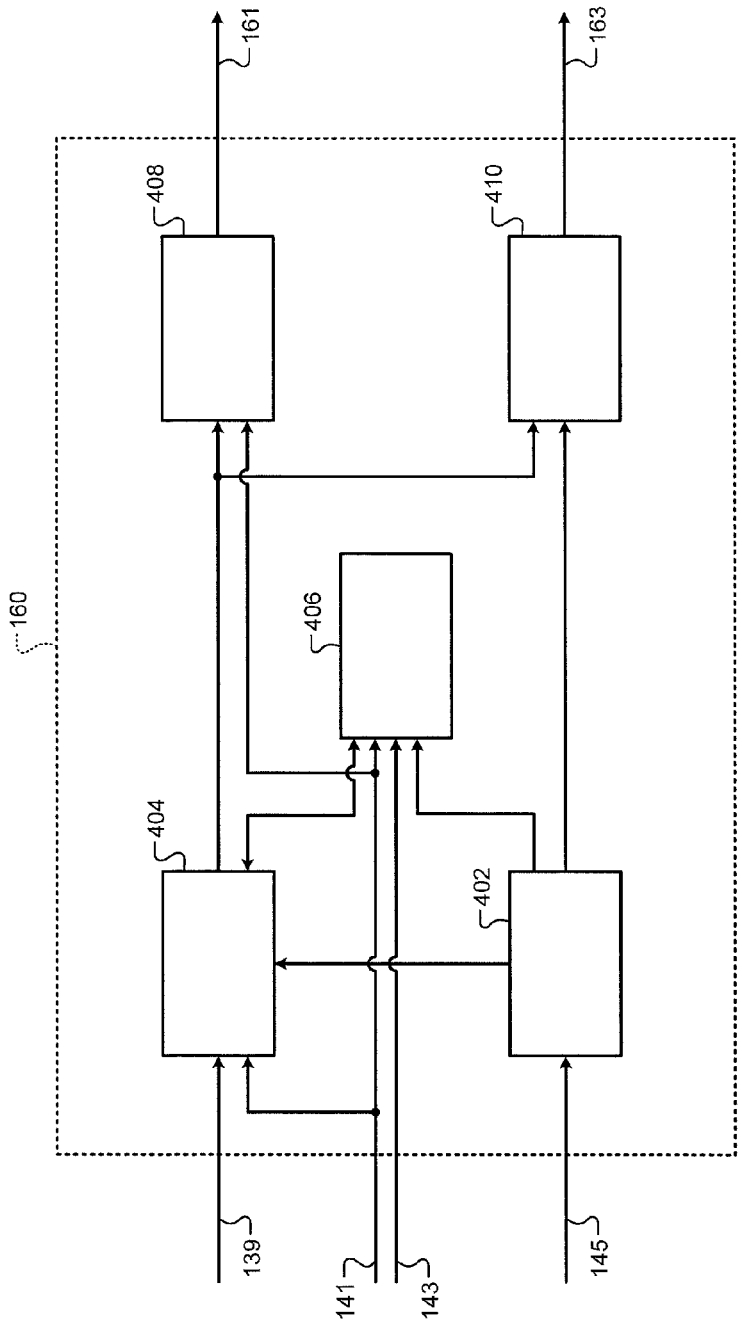
FIG. 4 is a functional block diagram of an example control module according to the principles of the present disclosure.

Referring to FIG. 4, an example of the control module 160 of FIG. 1 includes a vehicle speed module 402, an engine speed module 404, a selected gear module 406, a downshift indicator module 408, and an engine control module 410. The vehicle speed module 402 determines the vehicle speed based on the wheel speed. The vehicle speed module 402 outputs the vehicle speed.

The engine speed module 404 determines the engine speed based on the crankshaft position. When the clutch 126 is disengaged, the engine speed module 404 may estimate the engine speed at a future time when the clutch 126 is reengaged based on the selected gear and the vehicle speed. The engine speed module 404 may determine clutch engagement based on the clutch position. The engine speed module 404 outputs the engine speed.

The selected gear module 406 determines the selected gear. The selected gear module 406 may determine the selected gear based on the selector position. Additionally, the selected gear module 406 may determine the selected gear based on the vehicle speed, the engine speed, and the clutch position. The selected gear may be determined based on the ratio of the engine speed to the vehicle speed when the clutch 126 is fully engaged and the vehicle speed is greater than zero. The selected gear may also be determined based on vehicle parameters such as wheel size and axle ratio. The selected gear module 406 outputs the selected gear.

The downshift indicator module 408 generates the downshift indicator signal 161 indicating when to shift the transmission 104. The downshift indicator module 408 may generate the downshift indicator signal when the engine speed is less than a first speed. The first speed may be predetermined and may be greater than a resonant speed of the engine 102 that causes the flywheel 124 to oscillate at a resonant frequency. The downshift indicator module 408 may generate the downshift indicator signal 161 when the clutch 126 is disengaged and the selected gear may decrease the engine speed to less than the first speed when the clutch 126 is reengaged.

The downshift indicator module 408 may refrain from generating the downshift indicator signal 161 when the engine speed is less than the first speed for less than a first period. Additionally, the downshift indicator module 408 may refrain from generating the downshift indicator signal 161 when the clutch engagement is less than a first percentage. The first period and the first percentage may be predetermined.

The engine control module 410 generates the engine control signal 163 indicating when to stop the engine 102, for example, using a fuel cutoff. The engine control module 410 may stop the engine 102 when the engine speed is less than a second speed. The second speed may be predetermined, less than the first speed, and/or greater than the resonant speed. Thus, if the driver does not downshift when the downshift indicator module 408 generates the downshift indicator signal 161, the engine control module 410 may stop the engine 102 to prevent damage to the flywheel 124.

Figure 5:
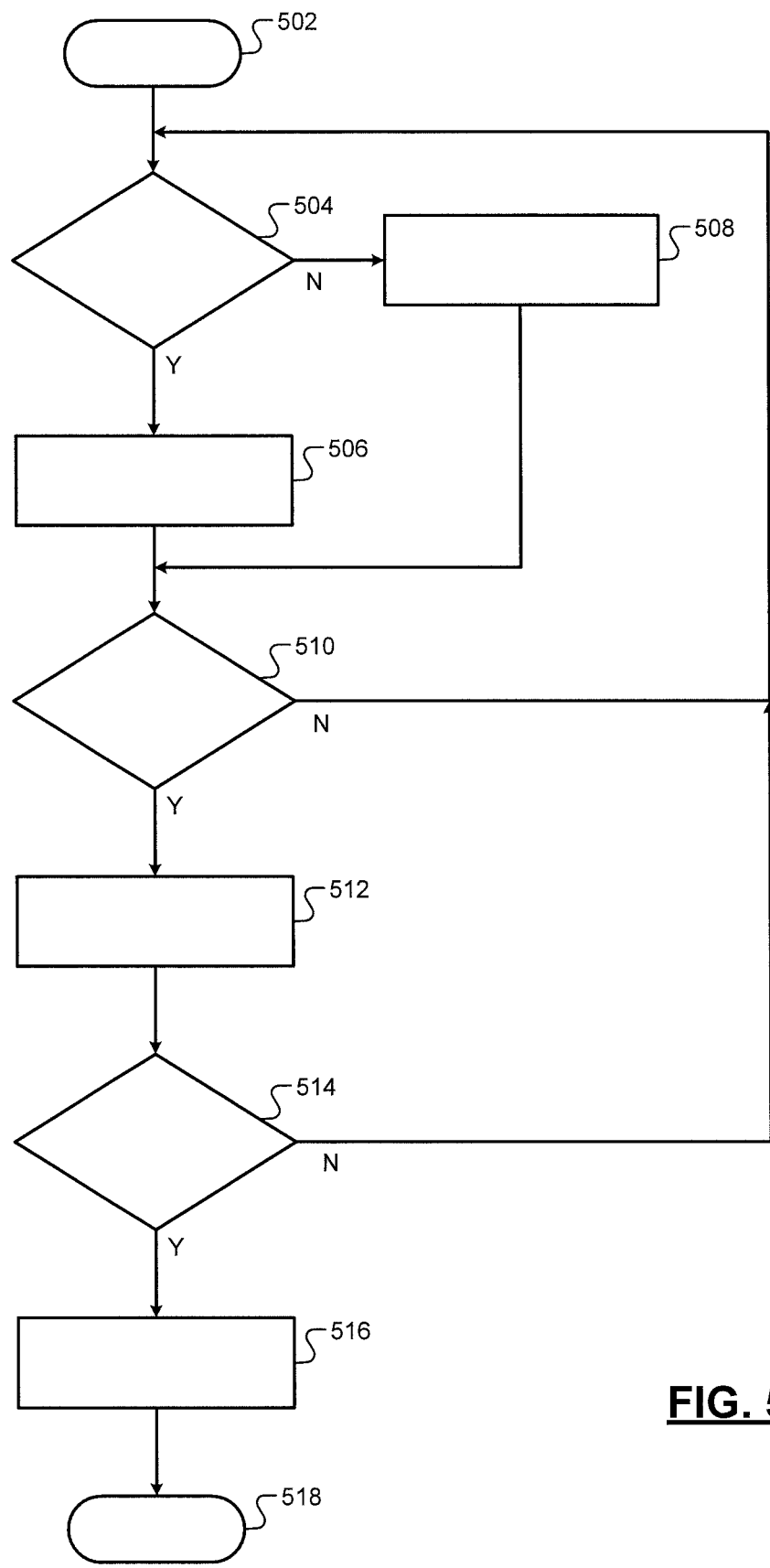
FIG. 5 is a flowchart illustrating an example control method according to the principles of the present disclosure.

Referring to FIG. 5, a method for protecting a dual mass flywheel attached to an engine based on engine speed begins at 502. At 504, the method determines whether a clutch is engaged with the dual mass flywheel to couple a manual transmission to the engine. The method may determine whether the clutch is engaged based on a measured position of a clutch and/or a clutch pedal. If the clutch is engaged, the method continues at 506. Otherwise, the method continues at 508.

At 506, the method determines the engine speed. The method may determine the engine speed based on a measured position of a crankshaft. At 508, the method estimates the engine speed at a future time when the clutch is reengaged. The method may estimate the engine speed based on vehicle speed and a selected gear of the manual transmission. The method may determine the selected gear based on a measured position of a gear selector.

At 510, the method determines whether the engine speed is less than a first speed. The first speed may be predetermined and may be greater than a resonant speed of the engine that causes the dual mass flywheel to oscillate at a resonant frequency. If the engine speed is less than the first speed, the method continues at 512. Otherwise, the method continues at 504.

At 512, the method instructs a driver to downshift the manual transmission. The method may generate a downshift indicator signal indicating when to downshift, and a shift indicator may instruct the driver to downshift in response to the downshift indicator signal. The shift indicator may instruct the driver to downshift using a visual message (e.g., text), an audible message (e.g., chime), and/or a tactile message (e.g., vibration). The shift indicator may instruct the driver to downshift to a particular gear.

At 514, the method determines whether the engine speed is less than a second speed. The second speed may be predetermined, less than the first speed, and/or greater than the resonant speed. If the engine speed is less than the second speed, the method continues at 516. Otherwise, the method continues at 504. At 516, the method stops the engine. The method may stop the engine by cutting off fuel flow to the engine. Thus, if the driver does not downshift as instructed, the method may stop the engine to prevent damage to the dual mass flywheel. The method ends at 518.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
    an engine speed module that determines an engine speed when a clutch is engaged with a dual mass flywheel; and
    a downshift indicator module that generates a downshift indicator signal when the engine speed is less than a first speed, the downshift indicator signal indicating when to downshift a manual transmission, wherein the first speed is based on a predetermined relationship between the engine speed and oscillation of the dual mass flywheel.

2. The system of claim 1, wherein the first speed is greater than a resonant speed of the engine that causes the dual mass flywheel to oscillate at a resonant frequency.

3. The system of claim 1, wherein, when the clutch is disengaged from the dual mass flywheel, the engine speed module estimates the engine speed at a future time when the clutch is reengaged.

4. The system of claim 3, wherein the engine speed module estimates the engine speed based on a selected gear of the manual transmission and vehicle speed.

5. The system of claim 4, further comprising a selected gear module that determines the selected gear based on a measured position of a gear selector.

6. The system of claim 5, further comprising a Hall effect sensor that generates a selector position signal indicating the measured position of the gear selector.

7. The system of claim 1, further comprising an engine control module that stops the engine when the engine speed is less than a second speed.

8. The system of claim 7, wherein the second speed is less than the first speed.

9. The system of claim 7, wherein the second speed is greater than a resonant speed of the engine that causes the dual mass flywheel to oscillate at a resonant frequency.

10. The system of claim 1, further comprising a shift indicator that in response to the downshift indicator signal, delivers at least one of a visual message, an audible message, and a tactile message indicating when to downshift the manual transmission.

11. A method comprising:
    determining an engine speed when a clutch is engaged with a dual mass flywheel; and
    generating a downshift indicator signal when the engine speed is less than a first speed, the downshift indicator signal indicating when to downshift a manual transmission, wherein the first speed is based on a predetermined relationship between the engine speed and oscillation of the dual mass flywheel.

12. The method of claim 11, wherein the first speed is greater than a resonant speed of the engine that causes the dual mass flywheel to oscillate at a resonant frequency.

13. The method of claim 11, further comprising, when the clutch is disengaged from the dual mass flywheel, estimating the engine speed at a future time when the clutch is reengaged.

14. The method of claim 13, further comprising estimating the engine speed based on a selected gear of the manual transmission and vehicle speed.

15. The method of claim 14, further comprising determining the selected gear based on a measured position of a gear selector.

16. The method of claim 15, further comprising generating a lector position signal using a Hall effect sensor, the selector position signal indicating the measured position of the gear selector.

17. The method of claim 11, further comprising stopping the engine when the engine speed is less than a second speed.

18. The method of claim 17, wherein the second speed is less than the first speed.

19. The method of claim 17, wherein the second speed is greater than a resonant speed of the engine that causes the dual mass flywheel to oscillate at a resonant frequency.

20. The method of claim 11, further comprising, in response to the downshift indicator signal, using a shift indicator to deliver at least one of a visual message, an audible message, and a tactile message indicating when to downshift the manual transmission.

* * * * *